US012068553B2

(12) United States Patent
Hermange et al.

(10) Patent No.: US 12,068,553 B2
(45) Date of Patent: Aug. 20, 2024

(54) FLAT CONDUCTOR CONNECTION ELEMENT

(71) Applicant: SAINT-GOBAIN GLASS FRANCE, Courbevoie (FR)

(72) Inventors: François Hermange, Aachen (DE); Bernhard Reul, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 192 days.

(21) Appl. No.: 17/797,975

(22) PCT Filed: Feb. 5, 2021

(86) PCT No.: PCT/EP2021/052872
§ 371 (c)(1),
(2) Date: Aug. 5, 2022

(87) PCT Pub. No.: WO2021/156480
PCT Pub. Date: Aug. 12, 2021

(65) Prior Publication Data

US 2023/0048545 A1 Feb. 16, 2023

(30) Foreign Application Priority Data

Feb. 7, 2020 (EP) .................................... 20156266

(51) Int. Cl.
*H05K 1/02* (2006.01)
*H01R 4/70* (2006.01)
(Continued)

(52) U.S. Cl.
CPC ............... *H01R 12/62* (2013.01); *H01R 4/70* (2013.01); *H01R 43/02* (2013.01)

(58) Field of Classification Search
CPC ........ H05K 1/02; H05K 1/0284; H05K 1/112; H05K 1/148; H05K 1/185; H05K 1/189;
(Continued)

(56) References Cited

U.S. PATENT DOCUMENTS 6,411,353 B1 * 6/2002 Yarita ................. G02F 1/13452 349/59
10,667,401 B2 * 5/2020 Heikkinen ............. H05K 3/368
(Continued)

FOREIGN PATENT DOCUMENTS

DE 93 13 394 U1 10/1993
DE 42 35 063 A1 4/1994
(Continued)

OTHER PUBLICATIONS

International Search Report as issued in International Patent Application No. PCT/EP2021/052872, dated May 14, 2021.

*Primary Examiner* — Xiaoliang Chen
(74) *Attorney, Agent, or Firm* — Pillsbury Winthrop Shaw Pittman LLP

(57) ABSTRACT

A flat-conductor connection element for an electrically conductive structure applied to a pane, includes at least one conductor, containing a flat conductor, having a first connection region at a first end and a second connection region at a second end, the first connection region having a connection surface for electrically connecting to the electrically conductive structure and having a contact surface opposite the connection surface for contact with a soldering tool; an encapsulation layer made of an electrically insulating material, which encapsulation layer surrounds the conductor at least in a conductor portion containing the first connection region, the encapsulation layer having a through-hole, through which the connection surface and the contact surface of the first connection region are accessible, the first
(Continued)

Figure 1:
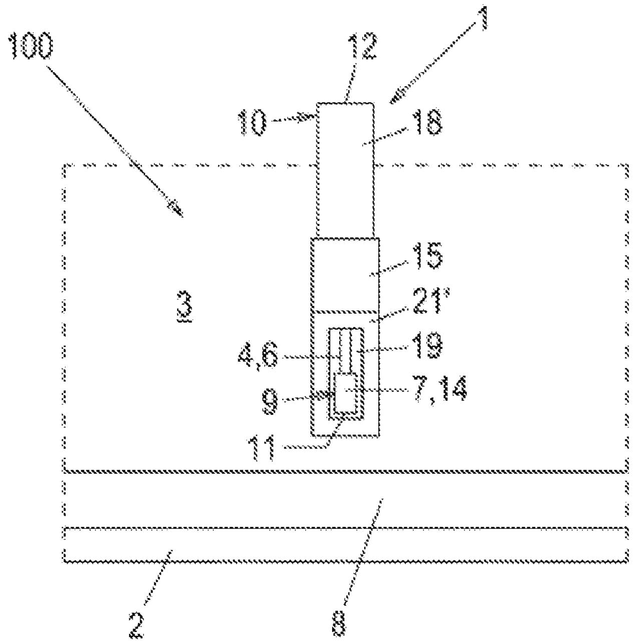

connection region of the conductor being within the through-hole in a view perpendicularly through the plane of the encapsulation layer.

20 Claims, 3 Drawing Sheets

(51) Int. Cl.

| | |
|---|---|
| ***H01R 12/62*** | (2011.01) |
| ***H01R 12/73*** | (2011.01) |
| ***H01R 24/30*** | (2011.01) |
| ***H01R 24/48*** | (2011.01) |
| ***H01R 43/02*** | (2006.01) |
| ***H01R 43/16*** | (2006.01) |
| ***H01R 43/20*** | (2006.01) |
| ***H05K 3/14*** | (2006.01) |

(58) Field of Classification Search
CPC ...... H05K 3/0014; H05K 3/284; H05K 3/368; H01L 23/562; H01L 24/48; H01L 27/1469; H01L 27/14618; H01L 27/14627; H01L 27/14634; H01L 27/14636; H01L 27/14685; H01R 4/70; H01R 12/62; H01R 12/73; H01R 12/714; H01R 13/665; H01R 13/6658; H01R 13/6675; H01R 24/30; H01R 24/48; H01R 31/065; H01R 43/02; H01R 43/16; H01R 43/20; G02F 1/13452; G02F 1/133308; G06F 1/1637
USPC ........ 174/250; 439/620.21, 577; 349/58, 59, 349/150; 29/747, 825
See application file for complete search history.

(56) References Cited

U.S. PATENT DOCUMENTS

| | | | | |
|---|---|---|---|---|
| 2018/0287294 | A1 | 10/2018 | Imeson et al. | |
| 2019/0165019 | A1 * | 5/2019 | Wang | ................ H01L 27/14634 |

FOREIGN PATENT DOCUMENTS

| | | | |
|---|---|---|---|
| DE | 199 60 450 | C1 | 5/2001 |
| DE | 102 49 992 | C1 | 12/2003 |
| DE | 20 2004 019286 | U1 | 4/2006 |
| DE | 10 2007 059818 | B3 | 4/2009 |
| EP | 1 153 801 | A2 | 11/2001 |
| WO | WO 01/56334 | A1 | 8/2001 |
| WO | WO 2016/104137 | A1 | 6/2016 |

* cited by examiner

FLAT CONDUCTOR CONNECTION ELEMENT

CROSS-REFERENCE TO RELATED APPLICATIONS

This application is the U.S. National Stage of PCT/EP2021/052872, filed Feb. 5, 2021, which in turn claims priority to European patent application number 20 156 266.7 filed Feb. 7, 2020. The content of these applications are incorporated herein by reference in their entireties.

The invention relates to a flat conductor connection element, a connection assembly having a flat conductor connection element, a method for production thereof, and use thereof.

Flexible flat conductors, also called ribbon conductors or foil conductors, are widely used in vehicle construction, in particular to enable movable, electrical contacting under limited space conditions.

Flat conductors are customarily made of a tinned copper strip with a thickness of 0.03 mm to 0.1 mm and a width of 2 mm to 16 mm. Copper has proved successful for such conductor tracks, since it has good electrical conductivity as well as good processability into foils, and at the same time, material costs are low. Other electrically conductive materials that can be processed into foils can also be used. Examples of this are gold, silver, aluminum, or tin.

For electrical insulation and for stabilization, the tinned copper strip can be applied on a carrier material made of plastic or laminated therewith on both sides. A plurality of conductive layers electrically isolated from each other can be situated in one foil conductor strip.

Flat conductor connection elements are known, for example, from EP 1 153 801 A2, DE 10 2007 059818 B3, WO 01/56334 A1, or WO 2016/104137 A1.

In the automotive sector, flat conductors are used, for example, for contacting electrically functional layers in composite glass panes. Examples are found in DE 42 35 063 A1, DE 20 2004 019 286 U1, or DE 93 13 394 U1. Additional prior art can be found in US 2018/287294 A1.

Such composite glass panes generally consist of at least two rigid individual glass panes that are adhesively bonded to one another surface-to-surface by a thermoplastic adhesive layer. The thickness of the adhesive layer is, for example, 0.76 mm. Additionally, situated between the individual glass panes are electrically functional layers such as heating coatings and/or antenna elements, which are connected to a flat conductor. A flat conductor suitable for this purpose has a total thickness of only 0.3 mm. Such thin flat conductors can easily be embedded between the individual glass panes in the thermoplastic adhesive layer.

The use of flat conductors for contacting electrically functional layers is not restricted to the automotive sector alone. As known from DE199 60 450 C1, flat conductors are also used in the construction sector. In composite or insulating glass panes, foil conductors are used for electrical contacting of integrated electrical components such as voltage-controlled electrochromic layers, solar cells, heating wires, alarm loops, or the like.

Usually, a pane with a complete connection element and a connection region for tool-free connection to further control electronics is required from the manufacturer of the pane.

In practice, it is customary to solder flat conductors to an electrically conductive structure by applying a hot stamp on the electrically insulating covering of the flat conductor. A disadvantage of this procedure can be only inadequate quality of the soldering since the solder joint cannot be seen through the electrically insulating covering. Only a hot stamp is well-suited as a soldering tool.

In contrast, the object of the present invention consists in making available an improved flat conductor connection element and a connection assembly produced therewith, which enables better quality control and, in particular, also enables the use of various soldering tools. In addition, it should be possible to produce the connection assembly simply, economically, and efficiently.

These and further objects are accomplished according to the proposal of the invention by a flat conductor connection element and a connection assembly, and by a method for producing the connection assembly in accordance with the coordinate claims. Preferred embodiments of the invention are apparent from the subclaims.

The flat conductor connection element according to the invention is intended for soldering to an electrically conductive structure on a pane. The electrically conductive structure is preferably an electrically conductive layer applied on a pane.

The flat conductor element includes at least one conductor, including at least one flat conductor. The conductor has a first connection region at a first end and a second connection region at a second end. The first connection region has a connection surface for the electrical connection to the electrically conductive structure and, opposite the connection surface, a contact surface for the (physical) contact with a soldering tool for soldering the connection surface. In the installed state, the connection and contact surfaces are parallel to the plane of the pane. The second connection region is used for connection to an electrical control device, voltage source, or the like.

According to one embodiment, the conductor comprises only the flat conductor (strip-shaped conductor, in particular a metal strip). It goes without saying that in this case, the first connection region is formed by the flat conductor. The flat conductor has two opposite sides or surfaces, which form the connection surface and the contact surface.

According to another embodiment, the conductor comprises a flat conductor that is electrically connected to a round conductor, with the round conductor optionally being electrically connected to a connection piece. The first connection region is formed by the round conductor or, optionally, by the connection piece. Advantageously, the connection surface and the contact surface are formed by opposite sides or surfaces of the connection piece.

A flat conductor (also called foil conductor or ribbon conductor) is an electrical conductor whose width is significantly greater than its thickness. The flat conductor is preferably thin enough (i.e., the thickness is low enough) that it is flexible and bendable.

The flat conductor preferably contains a metal foil, particularly preferably a strip or ribbon-shaped metal foil. In an advantageous embodiment of the flat conductor connection element according to the invention, the flat conductor comprises a metal foil, preferably a strip-shaped or ribbon-shaped metal foil.

Preferably, the flat conductor contains as metal foil a copper foil, an aluminum foil, a stainless-steel foil, a tin foil, a gold foil, or a silver foil or is made thereof. The metal foil can also contain or be made of alloys with the metals mentioned. The metal foil is advantageously tinned in some sections or completely. This is particularly advantageous for achieving good solderability along with corrosion protection.

In an advantageous embodiment of the flat conductor connection element, the flat conductor has a thickness of 10 μm to 300 μm, preferably of 30 μm to 250 μm, and in particular of 50 μm to 150 μm. Such thin flat conductors are particularly flexible and can, for example, be easily laminated into composite panes and routed out of them.

In another advantageous embodiment of the flat conductor connection element according to the invention, the flat conductor has a width of 0.5 mm to 100 mm, preferably of 1 mm to 50 mm, and in particular of 10 mm to 30 mm. In conjunction with the above-mentioned thicknesses, such widths are particularly suitable for achieving sufficient current-carrying capacity. The width of the flat conductor can be constant or it can vary in width.

In an advantageous embodiment of the flat conductor connection element according to the invention, the flat conductor has a length of 5 cm to 150 cm, preferably of 10 cm to 100 cm, and in particular of 50 cm to 90 cm. It goes without saying that the length, width, and thickness of the flat conductor can be adapted to the requirements of the respective individual case.

In the case of the flat conductor, the direction of the length defines the direction of extension. The length and width directions span the first side and the second side opposite the first side. The first side can, for example, also be called the bottom and the second side can be called the top of the flat conductor. The first end and the second end are, in each case, the ends of the flat conductor opposite one another in the direction of extension.

The flat conductor connection element further comprises a planar encapsulation layer made of an electrically insulating material that surrounds the conductor at least in a conductor section including the first connection region. The encapsulation layer has a first layer side, which faces the pane in the assembled state, and an opposite second layer side, which faces away from the pane in the assembled state. In the installed state, the two layer sides are parallel to the plane of the pane.

It is essential here for the encapsulation layer to have a through-hole, through which the connection surface and the contact surface of the first connection region are accessible from the outside such that the connection surface can be soldered to the electrically conductive structure and a soldering tool can be applied on the contact surface with physical contact to solder the connection surface to the electrically conductive structure. The through-hole is configured such that in a view perpendicular through the plane of the encapsulation layer, the first connection region of the conductor is situated within the through-hole (at least in the projection onto the plane of the encapsulation layer). In other words, the encapsulation layer surrounds the first connection region in the plane of the encapsulation layer, with the connection region exposed from both layer sides due to the through-hole. In the context of the present invention, the first connection region can even protrude from the through-hole perpendicular to the plane of the encapsulation layer (toward the electrically conductive structure). At least in the projection onto the plane of the encapsulation layer, the first connection region is always situated within the through-hole.

The through-hole advantageously enables soldering of the connection surface to the electrically conductive structure by applying a soldering tool, in particular a soldering iron, on the exposed contact surface. The quality of the soldering can easily be verified. After mounting of the flat conductor connection element on the side facing away from the pane, the through-hole can be sealed by a covering to prevent the penetration of water into the through-hole. In the context of the invention, the term "tightness" is to be understood to mean, in particular, water tightness, i.e., the penetration of water into the through-hole is prevented such that the first connection region of the conductor is protected against moisture.

The encapsulation layer is fixedly joined to the conductor and, for example, adhesively bonded. The encapsulation layer preferably contains or is made of polyimide or polyester, particularly preferably polyethylene terephthalate (PET) or polyethylene naphthalate (PEN). The encapsulation layer can also contain or be made of thermoplastics and elastomers, such as polyamide, polyoxymethylene, polybutylene terephthalate, or ethylene-propylene diene rubber. Alternatively, potting materials, such as acrylate or epoxy resin systems can be used as the encapsulation layer.

Due to the through-hole of the encapsulation layer, the first connection region of the conductor is exposed, i.e., is accessible from both layer sides. This enables simple electrical and, in particular, galvanic contacting of the conductor in the first connection region. It goes without saying that the two connection regions of the conductor can be protected against corrosion by an electrically conductive layer, such as tinning, or an electrically nonconductive layer, such as a solder resist. This protective layer is typically not removed, burned, or otherwise penetrated until the time the electrical contacting is made, in order to enable electrical contact.

The through-hole of the encapsulation layer can be produced, for example, by a window technique or by subsequent removal, for example, by a laser ablation or mechanical removal. In the window technique, the conductor is, for example, coated by insulation films with corresponding cutouts (windows) in the connection regions, for example, glued or laminated.

The through-hole extends completely from one layer side to the other layer side of the encapsulation layer, in the direction perpendicular to the plane of the encapsulation layer such that the first connection region of the conductor is exposed. The through-hole is, for example, a circular or round opening, with any other closed shape being equally possible, in particular, oval or rectangular.

According to an advantageous embodiment of the flat conductor connection element according to the invention, the encapsulation layer has, on the layer side that is to face the pane and/or on the layer side that is to face away from the pane, an adhesive means, in particular an adhesive tape, surrounding the through-hole. On the one hand, this enables attachment of the flat conductor connection element on the pane in a simple manner. On the other hand, a covering can be attached in a simple manner on the through-hole on the side facing away from the pane, in order to ensure the tightness of the flat conductor connection element after installation. Particularly advantageously in terms of tightness, the adhesive means is implemented such that it completely surrounds the through-hole on both layer sides.

According to another advantageous embodiment of the flat conductor connection element, the connection surface of the conductor has a soldering compound attached thereon. This facilitates the electrical contacting of the flat conductor connection element, since soldering the conductor onto the electrically conductive structure is possible in a simple manner. The soldering compound is, in a particularly practical manner, already provided by the flat conductor connection element.

According to another advantageous embodiment of the flat conductor connection element according to the invention, the flat conductor has at least one insulation layer and preferably an insulation film on the first side, on the second side, or on the first side and the second side. Advantageously, the insulation layer is fixedly joined to the flat conductor and, for example, adhesively bonded. The insulation layer or film preferably contains or is made of polyimide or polyester, particularly preferably polyethylene terephthalate (PET) or polyethylene naphthalate (PEN). The insulation layer can also be made of an electrically insulating lacquer, preferably a polymeric lacquer that is applied on the flat conductor, for example, by spraying or dipping the flat conductor into the lacquer. The insulation layer can also contain or be made of thermoplastics and elastomers, such as polyamide, polyoxymethylene, polybutylene terephthalate, or ethylene-propylene diene rubber. Alternatively, potting materials, such as acrylate or epoxy resin systems can be used as an insulation layer.

Such insulation layers or films preferably have thicknesses from 10 μm to 300 μm, particularly preferably from 25 μm to 200 μm, and in particular from 60 μm to 150 μm. The insulation layer is advantageously adhesively bonded to the flat conductor via an adhesive layer. The thickness of the adhesive layer is preferably from 10 μm to 150 μm and particularly preferably from 50 μm to 75 μm. Such insulation layers are particularly suitable for electrically insulating the flat conductor and stabilizing it mechanically and protecting it from mechanical damage and corrosion.

In an advantageous embodiment of the flat conductor connection element according to the invention, the flat conductor is sheathed with the above-mentioned insulation layer or film. The insulation layer can even be larger and in particular wider than the flat conductor. The insulation layer can also serve as a carrier layer for the flat conductor and mechanically stabilize it.

According to one embodiment of the flat conductor connection element according to the invention, the flat conductor is sheathed at least outside the encapsulation layer by an insulation layer (insulation sleeve) made of an electrically insulating material, which is designed like the above-described insulation layer, with the sheathed flat conductor advantageously being flexible. The flat conductor can thus be adapted in a simple manner to the space conditions at the installation site in a simple manner and can also serve to cover the through-hole.

Particularly advantageously, the sheathed flat conductor has, outside the encapsulation layer, a length such that the through-hole of the encapsulation layer can be covered by the insulation layer. The sheathed flat conductor can thus be routed via the through-hole and attached to the encapsulation layer on the side facing away from the pane in order to seal the through-hole. Advantageously, a further covering means can be dispensed with.

Flat conductors with an insulation layer are so thin that they can easily be embedded between the individual panes in the thermoplastic intermediate layer of a composite pane and routed out of it. The flat conductor is particularly suitable for contacting electrically conductive coatings in panes.

A plurality of conductive metal foils electrically insulated from one another can be situated in one flat conductor with an insulation layer according to the invention.

The invention further extends to a connection assembly comprising a pane with an electrically conductive structure, in particular, an electrically conductive layer, applied thereon. The connection assembly further includes a flat conductor connection element according to the invention, wherein the connection surface is electrically connected to the electrically conductive structure by soldering. The connection surface is in particular soldered directly to the electrically conductive structure. The connection assembly further includes a covering that covers (watertightly seals) the through-hole of the encapsulation layer on the layer side facing away from the pane. The covering is attached to the encapsulation layer.

According to an advantageous embodiment of the connection assembly according to the invention, the encapsulation layer is attached to the pane by an adhesive means, in particular an adhesive tape, with the adhesive means preferably having already been applied on the side of the encapsulation layer facing the pane before installation of the flat conductor connection element on the pane.

According to another advantageous embodiment of the connection assembly according to the invention, the covering is formed by the flat conductor sheathed by an insulation layer (insulation sleeve), which is attached to the encapsulation layer in the region of the through-hole, completely covering it. Alternatively, a separate covering part that is attached to the encapsulation layer can be provided as a covering. Particularly advantageously, the covering is attached to the encapsulation layer by an adhesive means, in particular an adhesive tape, enabling economical attachment of the covering that is simple to implement in practice. Preferably, the adhesive means is already attached to the side of the encapsulation layer facing away from the pane before installation of the flat conductor connection element.

The pane can be a single pane or a multi-pane glass, in particular a multi-pane composite glass.

The pane preferably contains glass, particularly preferably flat glass, even more preferably float glass, and in particular quartz glass, borosilicate glass, soda lime glass, or clear plastics, preferably rigid clear plastics, in particular polyethylene, polypropylene, polycarbonate, polymethyl methacrylate, polystyrene, polyamide, polyesters, polyvinyl chloride, and/or mixtures thereof. The pane is preferably transparent, in particular for use as a windshield or rear window of a vehicle or other uses where high light transmittance is desired. In the context of the invention, "transparent" then means a pane having transmittance greater than 70% in the visible spectral range. However, for panes that are not in the driver's traffic-relevant field of vision, for example, for roof panels, the transmittance can even be much lower, for example, greater than 5%.

The thickness of the pane can vary widely and thus be ideally adapted to the requirements of the individual case. Preferably, standard thicknesses of 0.5 mm to 25 mm, preferably of 1.4 mm to 2.5 mm are used for vehicle glass and preferably of 4 mm to 25 mm for furniture, appliances, and buildings, in particular for electrical heaters. The size of the pane can vary widely and is governed by the size of the application according to the invention. The pane has, for example, an area customary in the automotive sector and in the architectural sector of 200 $cm^2$ all the way to 20 $m^2$.

The invention further extends to a method for producing a connection assembly according to the invention, comprising the following steps:

Providing a pane having an electrically conductive structure applied thereon, in particular an electrically conductive layer, Arranging the flat conductor connection element according to the invention on the pane, Soldering the connection surface of the conductor to the electrically conductive structure, wherein a soldering tool, in particular a soldering iron, is applied on the contact surface, Sealingly covering the through-hole of the encapsulation layer.

According to an advantageous embodiment of the method according to the invention, the flat conductor sheathed outside the encapsulation layer by an insulation layer is routed via the through-hole on the layer side of the encapsulation layer facing away from the pane such that the through-hole is completely covered and is attached to the encapsulation layer, in particular by an adhesive means, such as an adhesive tape.

According to another advantageous embodiment of the method according to the invention, a separate covering part is attached to the encapsulation layer, in particular by an adhesive means, such as an adhesive tape.

The invention further extends to the use of the connection assembly according to the invention in the automotive sector or in the construction sector, in furniture, electrical appliances, or decorative items in a multi-pane composite glass pane. The connection assembly is used for soldering the connection surface of the conductor of the flat conductor connection element to an electrically conductive structure of a pane in the automotive sector or in the construction sector, in furniture, electrical appliances, or decorative items. The pane is, for example, a multi-pane composite glass pane.

The various embodiments of the invention can be implemented individually or in any combinations. In particular, the features mentioned above and those to be explained in the following can be used not only in the combinations indicated, but also in other combinations or in isolation, without departing from the scope of the present invention.

Figure 2:
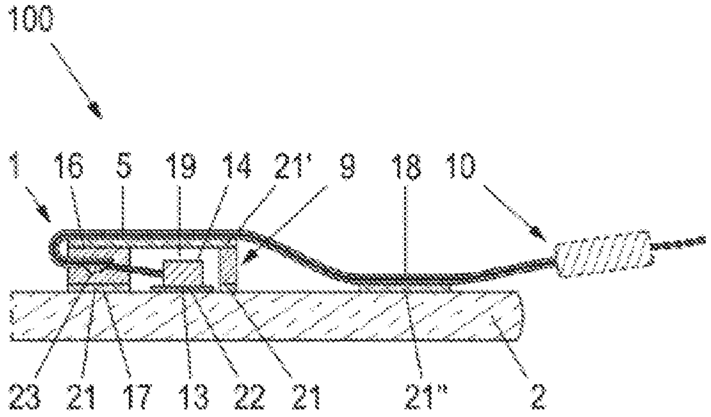
Figure 3:
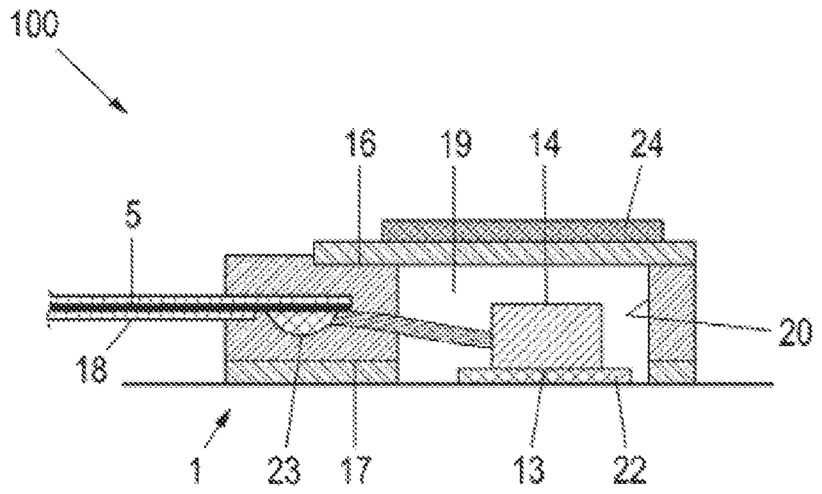
Figure 4A:
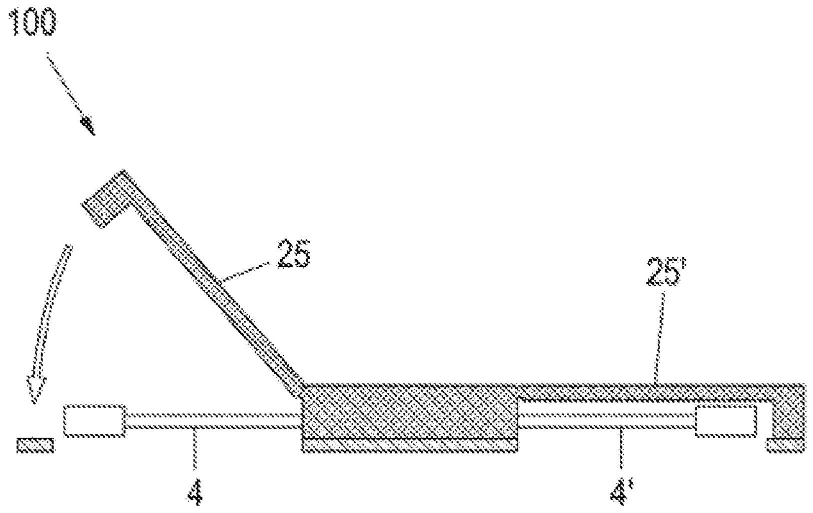
Figure 4B:
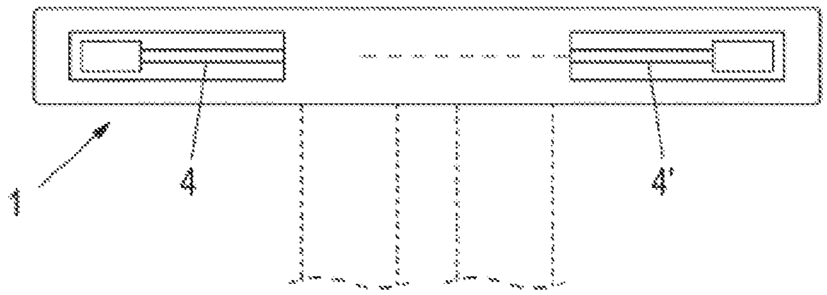
Figure 5:
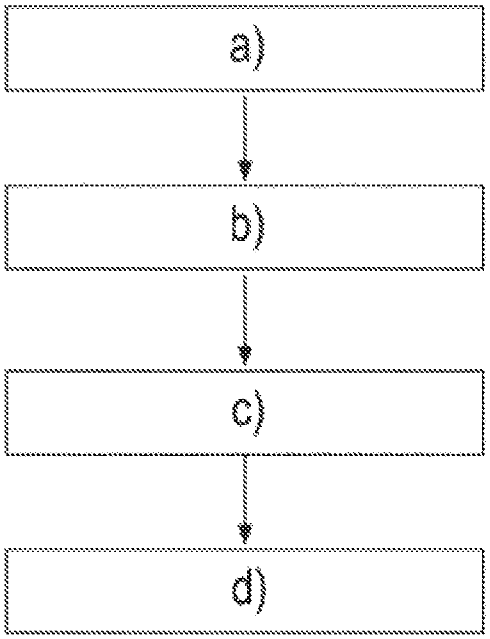

The invention is explained in detail in the following using exemplary embodiments, with reference to the accompanying figures. They depict, in simplified, not-to-scale representation:

FIG. 1 a schematic representation of an exemplary embodiment of the connection assembly according to the invention, in plan view, FIG. 2 a sectional view of the connection assembly of FIG. 1 in accordance with a first variant, FIG. 3 a sectional view of the connection assembly of FIG. 1 in accordance with a second variant, FIG. 4A-4B a schematic representation of another exemplary embodiment of the connection assembly according to the invention in plan view and in sectional view, FIG. 5 a flow chart of a method according to the invention for producing a connection assembly according to the invention.

Considered first are FIG. 1 to 3, wherein exemplary embodiments of the connection assembly according to the invention are illustrated schematically.

The connection assembly, designated overall by the reference number 100, comprises a flat conductor connection element 1 that is mounted on a pane 2. Here, the pane 2 is implemented, for example, in the form of a composite pane as a windshield of a motor vehicle. The composite pane comprises two individual panes that are fixedly joined to one another via a thermoplastic intermediate layer. A precise description of the structure of the composite pane is not necessary for understanding the invention such that its description is superfluous. The pane 2 could equally be only a single pane and be implemented, for example, as a so-called "single pane safety glass" (ESG). Here, the pane 2 is made, for example, of soda lime glass.

An electrically conductive layer 3, which is electrically contacted by the flat conductor connection element 1, is applied on one surface of the pane 2. The flat conductor connection element 1 is arranged near an engine-side pane edge of the pane, adjacent a bonding region 8 ("PU line"), where the pane 2 is glued into a vehicle body.

The flat conductor connection element 1 includes a conductor 4, which is composed here, for example, of a flat conductor 5 and a round conductor 6 connected thereto (see FIGS. 2 and 3). Also, a connection piece 7 is electrically connected to the round conductor 6.

The conductor 4 has a first connection region 9 at a first end 11 and a second connection region 10 at a second end 12. The first connection region 9 has, on its side facing the pane 2, a connection surface 13 for the electrical connection to the electrically conductive layer 3 and a contact surface 14 opposite the connection surface 13 for contact with a soldering tool (not shown) for soldering the connection surface 13 to the electrically conductive layer 3. The connection surface 13 and the contact surface 14 are parallel to the plane of the pane. The second connection region 10 is used for the connection to an electrical control device, voltage source, or the like, which is not shown in detail in the figures.

Alternatively, it would be equally possible for the conductor 4 to consist of only the flat conductor 5, with the first connection region 9 then being formed by the flat conductor 5. In particular, the connection surface 13 and the contact surface 14 are thus also formed by the flat conductor 5.

The flat conductor 5 includes or consists of a strip-shaped or ribbon-shaped metal foil, for example, a copper foil, an aluminum foil, a stainless-steel foil, a tin foil, a gold foil, or a silver foil. The flat conductor 5 has, for example, a thickness of 10 μm to 300 μm, preferably of 30 μm to 250 μm, and in particular of 50 μm to 150 μm. The flat conductor 5 has, for example, a width of 0.5 mm to 100 mm, preferably of 1 mm to 50 mm, and in particular of 10 mm to 30 mm. The flat conductor 5 has, for example, a length of 5 cm to 150 cm, preferably von 10 cm to 100 cm, and in particular of 50 cm to 90 cm. It goes without saying that the length, width, and thickness of the flat conductor 5 can be adapted to the requirements of the respective individual case.

The flat conductor connection element 1 has a planar encapsulation layer 15 made of an electrically insulating material, which surrounds or encapsulates the conductor 4 in a conductor section containing the first connection region 9. The encapsulation layer 15 has a first layer side 16, which faces the pane 2 in the mounted state, and an opposite second layer side 17, which faces away from the pane 2 in the mounted state. The two layer sides 16, 17 are parallel to the plane of the pane. The first layer side 16 can, for example, also be called the "bottom", and the second layer side 17 can be called the "top" of the encapsulation layer 15. The encapsulation layer 15 does not extend all the way to the second connection region 10 of the conductor 4. For example, the encapsulation layer 15 is made of polyimide or polyester.

The flat conductor 5 is electrically connected to the round conductor 6 in the region of the encapsulation layer 15. Outside the encapsulation layer 15, there is only the flat conductor 5, which is sheathed outside the encapsulation layer 15 by a planar insulation layer 18 (insulation sleeve) made of an electrically insulating material, here, for example, polymide [sic]. The flat conductor 5 sheathed by the insulation layer 18 outside the encapsulation layer 15 is flexible. The flat conductor 5 is fixedly connected to the encapsulation layer 15.

As is clearly discernible in FIG. 1 through 3, the encapsulation layer 15 has a through-hole 19, here, for example, rectangular, through which the connection surface 13 and the contact surface 14 of the first connection region 9 on both layer sides 16, 17 are accessible. FIG. 1 depicts the contact surface 14 from above.

When viewed perpendicular through the plane of the encapsulation layer 15 or through the plane of the pane 2, the first connection region 9 is situated within the through-hole 19. A wall 20 surrounding or delimiting the through-hole 19 surrounds the first connection region 9 completely (in a perpendicular view through the plane of the encapsulation layer 15). In the region of the first connection region 9, there is thus no material of the encapsulation layer 15 within the through-hole 19.

Both on the first layer side 16 and on the second layer side 17 of the encapsulation layer 15, there is a double-sided adhesive tape 21, 21', which is cut out in each case at the through-hole 19 and completely surrounds the through-hole 19 in each case. The encapsulation layer 15 is adhesively bonded to the pane 2 by the adhesive tape 21 arranged on the pane side.

As depicted in FIGS. 2 and 3, the flat conductor 5 is electrically connected, within the encapsulation layer 15, to the round conductor 6 by a contact element 23, for example, a clamping element. The connection piece 7 is soldered to the electrically conductive layer 3 at the connection surface 13 by a soldering compound 22. The connection piece 7 protrudes somewhat out of the through-hole 19 perpendicular to the pane 2. The soldering compound 22 is already attached to the connection piece 7 before soldering to the electrically conductive layer 3.

As depicted in FIG. 2, the flexible flat conductor 5, which is surrounded by the insulation layer 18, is guided over the first layer side 16 of the encapsulation layer 15 and completely covers the through-hole 19. The flat conductor 5 is attached to the encapsulation layer 15 by means of the adhesive tape 21. As a result, tightness of the through-hole 9 on the second layer side 17 can be achieved. On the opposite side, by means of the adhesive tape 21', with which the encapsulation layer 15 is attached to the pane 2, tightness of the through-hole 9 is achieved on the first layer side 16. The first connection region 9 is thus well protected against water ingress. In the course of its further extension, the flat conductor 5 is attached to the pane 2 by another adhesive tape 21''.

FIG. 3 illustrates a variant in which the through-hole on the first layer side 16 is completely covered by a planar cover piece 24 made of an electrically insulating material such as polyimide. The cover piece 24 is adhered by the adhesive tape 21'.

During manufacture of the connection assembly 100, the connection surface 13 can be soldered to the electrically conductive layer 3 in a simple manner, wherein a soldering tool, such as a soldering iron, can be applied on the contact surface 14. After the conductor 4 is soldered to the electrically conductive layer 3, the through-hole 19 can be sealingly covered using the sheathed flat conductor 5 or a separate cover piece 24. Due to the good visibility, the soldering can be carried out with high quality, with the ability to even use soldering tools such as soldering irons, enabling, in particular, manual soldering.

FIG. 4 illustrates another embodiment, in which the flat conductor connection element 1 has two conductors 4, 4', with the flat conductor connection element 1 otherwise having an analogous structure. Reference is made to the statements above. Only the two through-holes 19 are each covered by a cover flap 25, 25'.

FIG. 5 depicts a flow chart of a method according to the invention for producing the connection assembly 1 according to the invention.

The method comprises at least the following steps:

a) Providing a pane (2) having an electrically conductive structure (3) applied thereon, in particular an electrically conductive layer, b) Arranging the flat conductor connection element (1) on the pane (29 [sic (2)], c) Soldering the connection surface (13) of the conductor (4) to the electrically conductive structure (3), wherein a soldering tool, in particular a soldering iron, is applied on the contact surface, d) Covering the through-hole (19) of the encapsulation layer (15).

It is clear from the above statements that the invention makes available a flat conductor connection element and an associated connection assembly, by means of which, due to the through-hole of the encapsulation layer, simple and reliable soldering of the conductor is enabled. The through-hole can be sealingly covered in a simple manner.

REFERENCE CHARACTERS

1 flat conductor connection element
2 pane
3 electrically conductive layer
4,4' conductor
5 flat conductor
6 round conductor
7 connection piece
8 gluing region
9 first connection region
10 second connection region
11 first end
12 second end
13 connection surface
14 contact surface
15 encapsulation layer
16 first layer side
17 second layer side
18 insulation layer
19 through-hole
20 wall
21, 21', 21''' adhesive tape
22 soldering compound
23 contact element
24 cover piece
25,25' cover flap
100 connection assembly

The invention claimed is:

1. A flat conductor connection element for an electrically conductive structure, applied to a pane, with the flat conductor connection element comprising:

at least one conductor, containing a flat conductor, having a first connection region at a first end and a second connection region at a second end, wherein the first connection region has a connection surface for the electrical connection to the electrically conductive structure and a contact surface opposite the connection surface for physical contact with a soldering tool, and an encapsulation layer made of an electrically insulating material, which encapsulation layer surrounds the at least one conductor at least in a conductor section containing the first connection region, wherein the encapsulation layer has a through-hole, through which the connection surface and the contact surface of the first connection region are accessible, wherein, in a view perpendicular through a plane of the encapsulation layer, the first connection region of the conductor is situated within the through-hole.

2. The flat conductor connection element according to claim 1, in which wherein the encapsulation layer has, on a layer side that is intended to face the pane and/or on a layer side that is intended to face away from the pane, an adhesive element surrounding the through-hole.

3. The flat conductor connection element according to claim 1, wherein the connection surface has a soldering compound attached thereto.

4. The flat conductor connection element according to claim 1, wherein the flat conductor is sheathed outside the encapsulation layer by an insulation layer made of an electrically insulating material, wherein the sheathed flat conductor is flexible.

5. The flat conductor connection element according to claim 4, wherein the sheathed flat conductor has a length such that the through-hole of the encapsulation layer is coverable by the insulation layer.

6. The flat conductor connection element according to claim 1, in which wherein the first connection region is formed by the flat conductor.

7. The flat conductor connection element according to claim 1, wherein the flat conductor is electrically connected to a round conductor, optionally with a connection piece, wherein the first connection region is formed by the round conductor, or optionally the connection piece.

8. A connection assembly, comprising:

a pane with an electrically conductive structure applied thereon, a flat conductor connection element according to claim 1, wherein the connection surface is connected to the electrically conductive structure by soldering, and a covering of the through-hole of the encapsulation layer on the layer side facing away from the pane.

9. The connection assembly according to claim 8, wherein the encapsulation layer is attached to the pane by an adhesive element.

10. The connection assembly according to claim 8, wherein the covering is formed by the flat conductor sheathed by an insulation sleeve or a cover piece on the encapsulation layer.

11. The connection assembly according to claim 10, wherein the covering is attached to the encapsulation layer by an adhesive element.

12. A method for producing a connection assembly according to claim 8, comprising:

providing a pane having an electrically conductive structure applied thereon, arranging the flat conductor connection element on the pane, soldering the connection surface of the conductor to the electrically conductive structure, wherein a soldering tool is applied on the contact surface, and covering the through-hole of the encapsulation layer with a covering.

13. The method according to claim 12, wherein the flat conductor sheathed outside the encapsulation layer by an insulation sleeve is routed via the through-hole and is attached on the encapsulation layer.

14. The method according to claim 12, wherein a covering part is attached on the encapsulation layer.

15. A method comprising providing a connection assembly according to claim 1 for soldering the connection surface of the conductor of the flat conductor connection element to an electrically conductive structure of a pane in the automotive sector or in the construction sector, in furniture, electrical appliances, or decorative items.

16. The flat conductor connection element according to claim 1, wherein the electrically conductive structure is an electrically conductive layer.

17. The flat conductor connection element according to claim 2, wherein the adhesive element is an adhesive tape.

18. The connection assembly according to claim 8, wherein the electrically conductive structure is an electrically conductive layer.

19. The connection assembly according to claim 9, wherein the adhesive element is an adhesive tape.

20. The connection assembly according to claim 11, wherein adhesive element is an adhesive tape.

* * * * *